United States Patent [19]

Brändström

[11] Patent Number: 5,000,425
[45] Date of Patent: Mar. 19, 1991

[54] METHOD OF PREHEATING SCRAP

[75] Inventor: Martin Brändström, Ludvika, Sweden

[73] Assignee: SSAB Svenskt Stål Ab, Stockholm, Sweden

[21] Appl. No.: 364,937

[22] Filed: Jun. 12, 1989

Related U.S. Application Data

[63] Continuation-in-part of PCT SE87/00602 filed Dec. 14, 1987.

[30] Foreign Application Priority Data

Dec. 12, 1986 [SE] Sweden ................................ 8605365

[51] Int. Cl.$^5$ .............................................. C21B 7/22
[52] U.S. Cl. ........................................ 266/44; 75/581; 266/901; 266/156
[58] Field of Search ................. 266/44, 155, 156, 901, 266/144; 75/445, 581

[56] References Cited

U.S. PATENT DOCUMENTS

| | | | |
|---|---|---|---|
| 3,163,520 | 12/1964 | Collin et al. | 266/156 |
| 4,113,977 | 9/1978 | Hochstrasser et al. | 266/901 |
| 4,249,721 | 2/1981 | Udo | 266/156 |
| 4,548,651 | 10/1985 | Ramsey | 266/901 |
| 4,687,440 | 8/1987 | Wells | 266/901 |

Primary Examiner—S. Kastler
Attorney, Agent, or Firm—Nils H. Ljungman & Associates

[57] ABSTRACT

The scrap that is to be charged into an electric arc furnace is preheated by a gas in a closed circuit and this gas is heated in a heat exchanger by the exhaust fumes from the furnace. A minor part of the circulating gas is continuously led off to a burner in which it is burnt with a gas as fuel at such a high temperature that rest products such as dioxines are destroyed. The exhaust fumes from the burner is supplied to the exhaust fumes of the furnace upstream of the heat exchanger. In another burner, another minor part of the circulating gas is continuously burnt with a gas fuel at a substantially lower temperature so that hydrocarbons in the circulating gas burn. The exhaust fumes from the burner are returned to the closed circuit.

18 Claims, 1 Drawing Sheet

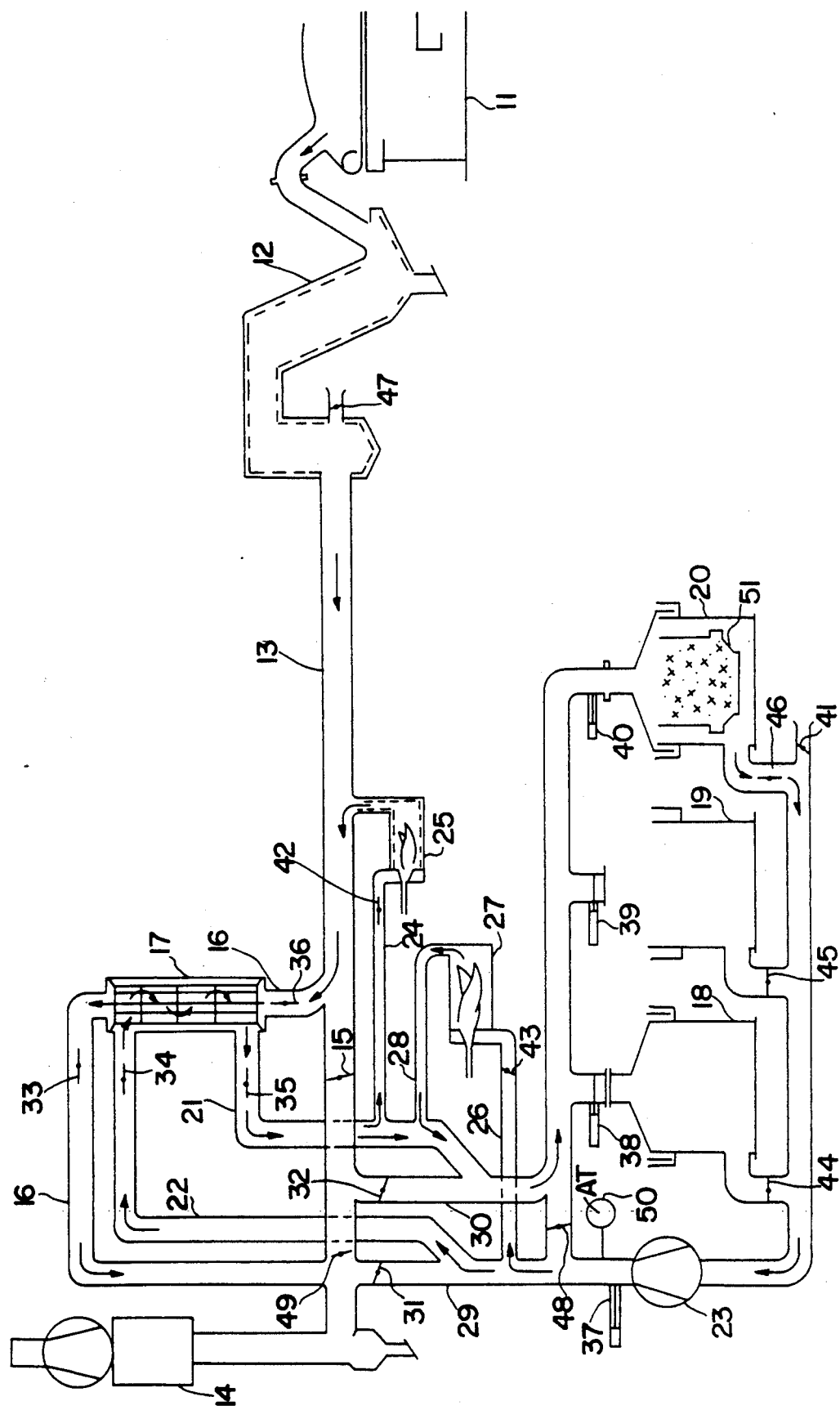

METHOD OF PREHEATING SCRAP

BACKGROUND OF THE INVENTION

This is a continuation-in-part of PCT SE87/00602 filed Dec. 14, 1987.

1. Field of the Invention

This invention relates to a method of preheating scrap that is to be charged into, preferably, an electrical smelting furnace by a circulating gas that is heated by a heat exchanger which receives heat from the exhaust fumes of the furnace.

2. Description of the Prior Art

It is desirable to preheat the scrap for various reasons. One important reason is, often, that the scrap should be dry when being charged into the furnace since water on the scrap will result in the development of an explosive gas.

It is, of course, advantageous to utilize a part of the energy in the exhaust fumes for the preheating in order to reduce the energy consumption. The preheating of the scrap has, also, a positive influence on the electrode consumption and on the yield and productivity.

There are several different prior art methods of preheating scrap. No prior method, however, combines, as the method according to the invention, negligible exhaust of undesired substances with comparatively low capital costs and low energy consumption.

SUMMARY OF THE INVENTION

One aspect of the invention resides broadly in a method for preheating scrap which is to be charged into a smelting furnace by circulating gas through a circuit containing the scrap with the gas being heated by exhaust from the furnace. This method includes removing heat from the exhaust of the smelting furnace; heating the circulating gas with the heat removed from the exhaust of the smelting furnace; preheating the scrap with the circulating gas; decomposing impurities in a first portion of the circulating gas; discharging a second portion of the circulating gas from the circuit; and at least partially replenishing the gas in the circuit by drawing air into the circuit in a volume which generally corresponds to the volume of the second portion of gas.

Another aspect of the invention resides broadly in a method of heating material which is to be charged into a furnace with heating apparatus which includes a first conduit for receiving exhaust fluid from the furnace; a second conduit in fluid communication with the first conduit for circulating a second fluid adjacent the material and for transferring at least a portion of the second fluid to the first conduit; heat exchanger apparatus in fluid communication with the first and second conduits for transferring heat from the exhaust fluid to the second fluid; burner apparatus in fluid communication with the second conduit for heating at least a portion of the second fluid and air inlet apparatus in the second conduit for supplying air to the second conduit. This method includes receiving the exhaust fluid from the furnace with the first conduit; circulating the second fluid in the second conduit and adjacent the material; transferring heat from the exhaust fluid to the second fluid with the heat exchanger; heating the material with the second fluid; heating at least a portion of the second fluid with the burner apparatus; transferring at least a portion of the second fluid from the second conduit to the first conduit; and supplying air to the second conduit with the air inlet device.

BRIEF DESCRIPTION OF THE DRAWINGS

The invention will be described with reference to the accompanying drawing which is a flow chart of the apparatus of the present invention.

DETAILED DESCRIPTION OF THE PREFERRED EMBODIMENTS

Exhaust fumes are conveyed to after burner 12, from electric steel smelting furnace 11 and through exhaust tube 13 and then to fan and filter unit 14. Valve 15 in tube 13 is normally closed and the exhaust fumes are, instead, conveyed through conduit 16 which is coupled in parallel with valve 15. Conduit 16 includes the primary circuit of heat exchanger 17.

Three scrap preheating skips, 18, 19 and 20, are coupled in parallel to the secondary circuit of heat exchanger 17, by means of inlet tube 22 and outlet tube 21, so that a closed preheating circuit 17 through 22 is formed. In the Figure, skip 20 is shown in operation whereas skips 18 and 19 are disconnected. Scrap cage 51 is in skip 20. Fan 23 is in closed preheating circuit 17 through 22.

Conduit 24, branched from conduit 21, leads to burner 25 and the exhaust fumes from burner 25 are conveyed to main conduit 13 upstream of heat exchanger 17.

Conduit 26, branched from conduit 16, leads to burner 27. Exhaust conduit 28 leads to conduit 21. Thus, burner 27 is coupled in parallel with skips 18 through 20. Alternatively, conduits 26 and 28 can both be coupled to conduit 21.

In the system shown, there are two conduits, 29 and 30, with valves 31 and 32 and there are, also, valves 33 through 49 and flame ionization detector 50, for gas analysis. In normal operation, the valves of the system are in the illustrated positions. The exhaust fumes from furnace 11 are sucked through after burner 12, conduit 16 and filter and fan unit 14. Fan 23 circulates gas through conduit 29, conduit 22, heat exchanger 17, conduit 21 and skip 20.

The exhaust flow from furnace 11 through primary circuit 16 of heat exchanger 17 can be 80,000 Nm$^3$/h. The temperature upstream of heat exchanger 17 can be 600–800° C. and downstream of heat exchanger 17 it can be 150–250° C. The secondary flow through heat exchanger 17 can also be 80,000 Nm$^3$/h and the gas from the heat exchanger in conduit 21 can be 500° C. The flow through conduit 24 can be 2,000 Nm$^3$/h and, by means of a supply of fuel such as gas to burner 25, the temperature of the exhaust from burner 25 can be 1,200° C. The flow through burner 25 is normally between 1% and 10% of the flow through the scrap and preferably between 2% and 5% thereof. The gas exhausted through conduit 24 is replaced partly by leakage air, that is unavoidable, particularly into skips 18 through 20 and partly by air sucked in through valve 41. Thus, a controlled subpressure, in skips 18 through 20, is maintained so that the pressure in conduit 13 is lower than that in conduit 24.

The flow through conduit 26 can be 10,000 Nm$^3$/h and, by means of a supply of fuel such as gas to burner 27, the temperature in exhaust conduit 28 can be 650° C.

The total content of hydrocarbons which is monitored with flame ionization detector 50, must not be high enough that the gas becomes explosive. The hydrocarbons are burnt, or decomposed in some other manner, in burner 27 at a suitable temperature, normally between 500° C. and 800° C., for example 650° C., and the flow through burner 27 can be controlled by means of valve 43. The flow through conduit 26 is normally between 10% and 20% of the flow through the scrap. The higher the oil content in the scrap, the higher the flow. Detector 50 is coupled to control valve 43.

Chlorobenzenes are not destroyed at the comparatively low temperature in burner 27 so the temperature in burner 25 is adjusted so that the chlorobenzenes decompose therein. The temperature in burner 25 should, therefore, exceed 900° C. Preferably the temperature should exceed 1,100° C. and, more preferably is, about 1,200° C. The flow through burner 25 is controlled by means of valve 42. Usually, additional air to burners 25 and 27 is not needed since the oxygen in the replacement air sucked into the preheating circuit 17 through 22, as described above, will be sufficient for the combustion.

As described above, there is a combustion in burner 27 at a comparatively low temperature and comparatively large flow, and the exhaust fumes are returned to the closed circuit 17 through 22. There is also combustion in burner 25 at a substantially higher temperature and lower flow, and the exhaust fumes are conveyed off the closed circuit 17 through 22. Less than 10%, or even less than 5%, of the flow circulated through the skips 18 through 20 is conveyed off the closed circuit.

Since the flows and temperatures in burners 25 and 27 can be controlled, a controlled and effective decomposition of the gaseous products from the preheating of the scrap can be achieved with reasonable energy consumption, Since the exhaust fumes from the electric arc furnace do not pass through the scrap, no dust is deposited on the scrap and the emission of dust will be negligible when the furnace is charged.

The invention is not limited to the above described examples but modifications can be made within the scope of the claims. Burner 27, for example, can be omitted if the flow through burner 25 is increased to 15%-30%, preferably 20%-25%. This will result, however, in greater energy consumption.

Another example of a method for preheating scrap can be found in U.S. Pat. No. 4,559,629, entitled "Procedure and Means for Preheating Scrap to be Charged into a Smelting Furnace". This patent is hereby incorporated by reference as if the entire contents were fully set forth herein.

In summary, one aspect of the invention resides broadly in a method of preheating scrap that is to be charged into a smelting furnace, particularly into an electric arc furnace 11. The scrap is preheated by a circulating gas that, by the use of a heat exchanger 17, is heated by the exhaust fumes of the furnace. A minor part of the circulating gas is continuously removed and burnt and replaced by clean gas, particularly air. The removed gas is burnt with additional fuel at a temperature exceeding 900° C. and being at least 1,100° C. The burnt gas is utilized in the heat exchanger. A second part of the circulating gas is continuously removed and burnt with additional fuel, and the exhaust fumes are conveyed back to the circulating gas. The second part of the circulating gas is burnt at a temperature between 500° C. and 800° C. Subpressure is maintained in a skip 20 that contains the scrap that is being preheated.

The invention as described hereinabove in the context of a preferred embodiment is not to be taken as limited to all of the provided details thereof, since modifications and variations thereof may be made without departing from the spirit and scope of the invention.

What is claimed is:

1. A method of heating material, which is to be charged into a furnace, with heating apparatus which heating apparatus includes a first conduit which receives exhaust fluid from the furnace, a second conduit in fluid communication with the first conduit for circulating a second fluid adjacent the material and for transferring at least a portion of the second fluid to the first conduit, heat exchanger means in fluid communication with the first and second conduits for transferring heat from the exhaust fluid to the second fluid, burner apparatus in fluid communication with the second conduit, for heating at least a portion of the second fluid, and air inlet apparatus, in the second conduit, for supplying air to the second conduit, said method comprising the steps of:

receiving the exhaust fluid from the furnace with the first conduit;

circulating the second fluid in the second conduit and adjacent the material to be charged into the furnace;

transferring heat from the exhaust fluid to the second fluid with the heat exchanger means;

heating the material to be charged into the furnace with the second fluid;

burning a minor portion of the second fluid with the burner apparatus, said minor portion of the second fluid being continuously removed from the second conduit;

circulating said burnt minor portion of said second fluid through the heat exchanger to remove heat from said burnt minor portion of said second fluid; and supplying air to the second conduit with the air inlet apparatus.

2. The method according to claim 1, further including the step of transferring said burnt minor portion of the second fluid from the second conduit to the first conduit.

3. The method according to claim 1, wherein said minor portion of the second fluid is heated to at least 900° C. by the burner apparatus.

4. The method according to claim 3, wherein said minor portion of the second fluid is heated to at least 1,100° C. by the burner apparatus.

5. The method according to claim 3, wherein the portion of the second fluid which is transferred from the second conduit to the first conduit is heated by the burner apparatus and transferred to the heat exchanger by the first conduit.

6. The method according to claim 5, further including burner means for being in fluid communication with the second conduit for receiving a portion of the second fluid from the second conduit, heating said portion of the second fluid and returning said portion of the second fluid to the second conduit.

7. The method according to claim 6, wherein the burner means heats the second fluid to a temperature generally in the range of 500° C. to 800° C.

8. The method according to claim 6, wherein:

said minor portion of the second fluid is less than ten percent of the second fluid; and said portion of the second fluid that is received by said burner means is about ten percent to about twenty percent of the second fluid.

9. The method of claim 1, wherein said heating of said minor portion of the second fluid to a given temperature by the burner apparatus at least partially destroys chlorobenzenes in the second fluid.

10. The method of claim 8, wherein said heating of said portion of the second fluid to a given temperature by said burner means at least partially destroys hydrocarbons in the second fluid.

11. The method of claim 10, wherein said burner means operates generally in the range of about 500° C. to about 800° C.

12. The method for preheating scrap which is to be charged into a smelting furnace by circulating gas through a circuit which contains the scrap with the gas being heated by exhaust from the furnace, said method comprising the steps of:

- removing heat from the exhaust of the smelting furnace by heat exchanger means;
- heating the circulating gas with the heat removed from the exhaust of the smelting furnace;
- preheating the scrap with the circulating gas;
- removing a minor portion of the circulating gas from the circuit;
- burning said minor portion of said gas with a flame to decompose gaseous products, said gaseous products being products that decompose by burning only at a temperature that is higher than the lowest temperature at which hydrocarbons decompose by burning;
- discharging said minor portion of the circulating gas from the circuit; and
- at least partially replenishing the gas in the circuit by drawing air into the circuit in a volume which generally corresponds to the volume of said minor portion of gas.

13. A method for preheating scrap which is to be charged into a smelting furnace by circulating gas through a circuit which contains the scrap with the gas being heated through a heat exchanger by exhaust from the furnace, said method comprising the steps of:

- removing heat form the exhaust of the smelting furnace;
- heating the circulating gas through the heat exchanger with the heat removed from the exhaust of the smelting furnace;
- preheating the scrap with the circulating gas;
- decomposing impurities in a first portion of the circulating gas;
- burning a minor portion of said gas with a flame, said minor portion of said gas being of a smaller volume than the volume of said first portion of said gas;
- circulating said minor portion of said gas through the heat exchanger to remove heat from said minor portion of said gas;
- discharging said minor portion of the circulating gas from the circuit; and
- at least partially replenishing the gas in the circuit by drawing air into the circuit in a volume which generally corresponds to the volume of said minor portion of gas.

14. The method according to claim 13, wherein said burning of said minor portion of said gas with said flame is performed at at least 900° C.

15. The method according to claim 14, wherein said burning of said minor portion of said gas with said flame is performed at at least 1,100° C.

16. The method according to claim 15, further including the step of burning said first portion of said gas and recirculating said burnt first portion of said gas through the circuit.

17. The method according to claim 16, wherein said burning of said first portion of said gas is performed at a temperature generally in the range of 500° C. to 800° C.

18. The method for preheating scrap, which is to be charged into a smelting furnace, by circulating gas through a circuit which contains the scrap with the gas being heated by exhaust from the furnace, said method comprising the steps of:

- removing heat from the exhaust of the smelting furnace by heat exchanger means;
- heating the circulating gas with the heat removed by said heat exchanger means from the exhaust of the smelting furnace;
- preheating the scrap with the circulating gas;
- removing a minor portion of the circulating gas from the circuit;
- burning said minor portion of said gas with a flame to decompose gaseous products;
- discharging said burnt minor portion of the circulating gas from the circuit; and
- at least partially replenishing the gas in the circuit by drawing air into the circuit in a volume which generally corresponds to the volume of said minor portion of gas.

* * * * *